United States Patent [19]
Watzke et al.

[11] Patent Number: 5,599,753
[45] Date of Patent: Feb. 4, 1997

[54] BOROSILICATE GLASS WEAK IN BORIC ACID

[75] Inventors: Eckhart Watzke; Andrea Kämpfer; Thomas Kloss; Gerhard Kemmler, all of Jena, Germany

[73] Assignee: Jenaer Glaswerck GmbH, Jena, Germany

[21] Appl. No.: 521,325

[22] Filed: Aug. 30, 1995

[30] Foreign Application Priority Data

Aug. 30, 1994 [DE] Germany ............... 44 30 710.1

[51] Int. Cl.⁶ ..................... C03C 3/091; C03C 3/093
[52] U.S. Cl. .................. 501/66; 501/67; 501/70; 501/905
[58] Field of Search .................. 501/66, 67, 905, 501/70

[56] References Cited

U.S. PATENT DOCUMENTS

| | | | |
|---|---|---|---|
| 3,499,776 | 3/1970 | Baak et al. | 501/67 |
| 3,527,648 | 9/1970 | Baak et al. | 501/66 |
| 3,728,139 | 4/1973 | Carrier et al. | 501/67 |
| 3,984,252 | 10/1976 | Kieter | 501/66 |
| 4,259,118 | 3/1981 | Sack | 501/66 |
| 5,219,801 | 6/1993 | Shorrock et al. | 501/65 |
| 5,459,110 | 10/1995 | Brix | 501/67 |

FOREIGN PATENT DOCUMENTS

| | | |
|---|---|---|
| 767476 | 9/1952 | Germany . |
| 2818804 | 11/1978 | Germany . |
| 2756555 | 6/1979 | Germany . |
| 3722130 | 1/1989 | Germany . |
| 4230607 | 1/1994 | Germany . |
| 301821 | 4/1994 | Germany . |
| 4-33741 | of 1992 | Japan . |
| 424825 | 11/1974 | U.S.S.R. . |
| 675010 | 7/1979 | U.S.S.R. . |
| 791374 | 2/1958 | United Kingdom . |

OTHER PUBLICATIONS

"Database WPI", Section Ch, Week 7533, Derwent Publications Ltd., London, GB; Class L01, AN 75–55224W & SU–A–443 003 (Glass Res Des Inst), Dec. 15, 1974, Abstract.

"Glas" by H. Thiene, vol. 2, (1939), pp. 634 to 635.

"Anorganische Chemie" by M. Schnidt, vol. 1, (1967), pp. 212 and 213.

"Die physikalischen und chemischen Grundlagen der Keramik" by Salmang/Scholze, Springer Verlag, (1968), pp. 334 to 337.

"Adding Lithium Minerals Can Reduce Melting Costs" by D. Kingsnorth, Glass Industry, vol. 69, Mar. 10, 1988, pp. 18 to 25.

"Chromatographie im Glasrohr", Schott Informationen 56/91, Book 3, pp. 18 to 20.

"Glass" by H. Scholze, Springer Verlag, (1988), p. 321.

"Influence of $Li_2O$ addition on viscosity and viscosity–dependent glass properties" by Y. Tang et al, Glastechnische Berichte G3, (1990), pp. 410 to 419.

"Untersuchung korrodierter Floatglasoberflächen" by M. Feldmann et al, vol. 66, DGG–Tagung, Fulda, May 1992.

"Improvement of the Electrical Properties of Glass by Lithia Addition", American ceramic Society Bulletin, vol. 72, No. 4, (1993), pp. 85 to 88.

*Primary Examiner*—Mark L. Bell
*Assistant Examiner*—Louis M. Troilo
*Attorney, Agent, or Firm*—Walter Ottesen

[57] ABSTRACT

Borosilicate glass weak in boric acid having a high chemical stability with an alkali resistance according to DIN 52 322 of LBK-Class 1, a thermal expansion $\alpha_{20/300}$ between 4.0 to $5.3 \times 10^{-6} K^{-1}$, a ratio $\alpha'/\alpha$ of thermal expansion coefficients above $T_g(\alpha')$ to below $T_g(\alpha)$ of 4 to 8, a glass transformation temperature between 500° C. and 600° C., high radiation transmittance and a UV transmission $\tau_{250\ nm/1\ mm}$ of 0 to 70% or $\tau_{300\ nm/1\ mm}$ of 0 to 91% of the composition in percent by weight on oxide basis of: $SiO_2 > 75$; $B_2O_3$ 1 to <9; $Al_2O_3$ 3 to 6; $Li_2O$ 0 to 4; $Na_2O$ 0 to 8; $K_2O$ 0 to 6; MgO 0 to 3; CaO 0 to 3; BaO 0 to 2; SrO 0 to 2; ZnO 0 to 3; $ZrO_2$ 0 to 3; $SnO_2$ 0 to 3; SnO 0 to 3; $TiO_2$ 0 to 2; $CeO_2$ 0 to 2; $Fe_2O_3$ 0 to 1; with $SiO_2 + B_2O_3 > 83$; $SiO_2 : B_2O_3 > 8$; $SiO_2 + Al_2O_3 + ZrO_2 > 83$; $Li_2O + Na_2O + K_2O$ 5 to 10; MgO+CaO+BaO+SrO+ZnO>3.

9 Claims, 1 Drawing Sheet

BOROSILICATE GLASS WEAK IN BORIC ACID

FIELD AND BACKGROUND OF THE INVENTION

Borosilicate glasses include many groups of glasses having known desirable characteristics such as high thermal and chemical stability and high mechanical strength.

The borosilicate glasses can be processed without difficulty by machine in accordance with conventional technologies from the melt flux.

Corresponding to the special application purpose of the glasses, individual ones of the above-mentioned or additional characteristics have been developed further by special glass compositions. The characteristics include, for example, the electrical conductivity, the fuse characteristics, the transmission, the absorption (including X-ray absorption) or the thermal tempering or the chemical tempering.

However, from the state of the art, it is apparent that a requirement for glasses having improved characteristics exists which have as many as possible of the desired physical-chemical characteristics simultaneously.

In Table 1, borosilicate glasses of high thermal and chemical stability with slight thermal expansion are listed with their compositions and selected characteristics.

It becomes clear that the borosilicate glasses in the area of thermal expansion ($\alpha_{20/300}$ approximately 4 to $5 \times 10^{-6}$ K$^{-1}$) have no optimal resistance with respect to alkali solutions. It is also clear that the reference glass "borosilicate glass 3.3" (DURAN™) of the alkali-resistant class 2 likewise has no optimal resistance with respect to alkali solutions.

According to DIN 52 322, the glasses are subdivided into three LBK classes in dependence upon their resistance to the attack of alkali solutions The classes are as follows:

| LBK-Class | Weight Loss mg/dm$^2$ | Extent of Attack by Alkali Solutions |
| --- | --- | --- |
| 1 | up to 75 | slight attack |
| 2 | greater than 75 and up to 175 | moderate attack |
| 3 | greater than 175 | intense attack |

The glasses of Class 1 of alkali resistance should accordingly have a removal of maximally 75 mg/dm$^2$.

There are many borosilicate glasses known in the system $SiO_2$—$B_2O_3$—$Al_2O_3$—$M_2O$—MO (wherein $M_2O$=alkali oxides and MO=earth alkali oxides and ZnO) which have an alkali resistance with a removal of approximately 100 mg/dm$^2$ such as shown in Table 2, Example 1.

This resistance against alkali-solution attack is inadequate for the highest requirements and can be improved in a manner known per se by stabilizing admixtures and especially by the admixture of $ZrO_2$. The positive effect of $ZrO_2$ admixtures is described in the technical literature and in patent publications. In this connection, reference can be made, for example, to the text of Thiene entitled "Glas", (1938), Volume 2 pages 634 and 635; Scholze, entitled "Glas", Springer Verlag, (1988), page 321, and in patent publications such as British Patent 791,374; U.S. Pat. No. 4,259,118, German Patent 3,722,130 and German patent publication DD 301,821 A7.

In Table 2, melt examples are listed from German patent publication DD 301,821 A7 which show that the alkali attack can be reduced with admixtures of approximately 1 to 2 percent by weight of $ZrO_2$ so that in some cases LBK-Class 1 is reached (see Table 2, Examples 4 and 5).

The samples of the glass of Example 5 of Table 2 were melted in three separate test series and each of these three samples was then measured. The resistance to alkali solution obtained with the removals 70, 74 and 79 mg/dm$^2$ is therefore not to be included in LBK-Class 1. Increasing the $ZrO_2$ admixture to further improve and therefore stabilize the resistance to alkali solution serves no purpose because melt and cost problems occur, that is, the crystallization stability of the glass is lost.

From the example of the melts of Table 2, Example 5, it becomes clear that the removal must be dropped to below approximately 70 mg/dm$^2$ for a stable adjustment of the class 1 glasses in order to provide a "stability reserve". Such a reserve is even then purposeful when a glass composition provides removal values during reproduction meltings which scatter less and lie, for example, in the range of 70 to 73 mg/dm$^2$.

In practice, small changes of the determined composition must be made, however, in order to adapt the glass, for example, to the corresponding melt process. For this reason, a synthesis-produced change of the removal value is often unavoidable. The known borosilicate glasses in the system ($SiO_2>70$ percent by weight; $B_2O_3<15$ percent by weight; $Al_2O_3<10$ percent by weight; $M_2O<10$ percent by weight; MO<10 percent by weight; and, $ZrO_2<5$ percent by weight) have either the disadvantage that they do not realize the ratio $SiO_2:B_2O_3>8$ (in percent by weight) required for a high resistance to alkali solutions or that they do not satisfy additional requirements with respect to the portions of $SiO_2$, $Al_2O_3$ and $ZrO_2$ (see Tables 1, 2 and 3) or of MgO, CaO, BaO and ZnO.

A typical example of a glass composition which is not optimal in the sense of the invention is the glass of the JENA$^{er}$ apparatus glass type of rounded composition in percent by weight on oxide basis) $SiO_2$ 75; $B_2O_3$ 10; $Al_2O_3$ 5; $Na_2O+K_2O$ 5; CaO+BaO 5 which, in modified form, reaches a ratio of $SiO_2:B_2O_3=8.4$ (see Table 1, Example 2 as JENA$^{er}$ G 20) but does not contain $ZrO_2$ and reaches only 80.5 percent by weight in the sum $SiO_2+Al_2O_3$ (+$ZrO_2$).

A further example of a resistance to alkali solution which is not optimal is given by the commercial glass SUPRAX™/ 8486.

SUPRAX™/8488 defines a modified SUPRAX™ which achieves an improved alkali resistance within LBK-Class 2 because of a $ZrO_2$ admixture but which does likewise not correspond to LBK-Class 1.

However, the glass does not satisfy the conditions in accordance with the invention with reference to the base glass. For this reason, a decisive improvement of the alkali resistance cannot be obtained by introducing $ZrO_2$.

Further examples of portions of MO (MgO, CaO, BaO, SrO, ZnO), which are too high, are shown in Table 3. When glasses have relatively high portions of MgO, CaO, BaO, SrO and ZnO (sum MO>3 percent by weight), it is not possible to adjust the conditions of the invention with respect to proportions and ratios of the components for realizing a high resistance to alkali solutions. The MO-rich glasses furthermore have the disadvantage that they make possible only a relatively slight UV-transmission because of the inherent absorption of these oxides.

A great disadvantage of the discussed glasses is that they contain no lithium ions and therefore are not suitable to chemical tempering below the transformation temperature, that is, it is often not recognized nor is it considered that thermally temperable glasses must satisfy specific requirements with respect to the ratio of the thermal expansion coefficients above $T_g$ to below $T_g$.

The thermal temperability of borosilicate glasses of high resistance to thermal shock or high thermal stress factors and thermal expansion coefficients $\alpha_{20/300}=3.39–5.32\times10^{-6}K^{-1}$ is discussed in U.S. Pat. No. 4,259,118 and it has been found that for this group of glasses, the ratio $\alpha'/\alpha$ of the thermal expansion coefficients above $T_g(\alpha')$ to below $T_g(\alpha)$ should be between 4.1 and 9.4 in order to provide improved temperability and therefore mechanically stronger glasses. However, it is a disadvantage that these glasses contain a MO-portion which is too great and an $Al_2O_3$-portion which is too low so that the synthesis conditions to obtain a high alkali resistance are not given (see Table 4).

The significance of the thermal stress factor R is noted in German Patent 2,756,555 and is defined there as presented below:

$$R=\sigma_B(1-\mu)/\alpha E$$

wherein:
R—thermal stress factor
$\sigma_B$—bending tensile strength (basic strength+pressure tempering)
μ—poisson's ratio α—mean linear thermal expansion coefficient
E—Young's modulus As noted in the text of Salmang-Scholze entitled "Die physikalischen und chemischen Grundlagen der Keramik", Springer Verlag, (1968), pages 334 to 337, R is the first thermal stress factor which is applicable to large heat transfer numbers and gives the maximum temperature difference ($\Delta T_{max}$) which a body can still sustain without being destroyed.

For partially heated glasses which are subjected to high thermal load, a large thermal stress factor is desired in accordance with the above-mentioned relationship. This thermal stress factor is to be influenced by large values of σB (for example, by applying a large pressure pretempering) or low thermal expansion coefficients.

In the literature, the significance of a high alkali resistance with a simultaneously high hydrolytic and acid stability for borosilicate glass 3.3 is often emphasized. In this connection, reference can be made to the publication entitled "SCHOTT Information", 56/91, Number 3, pages 18 to 20.

A high alkali resistance can, in some cases, also be desirable even though the direct application of the glass does not necessarily require this.

With the storage of conventional float glass panels of LBK-Class 2, for example, condensate forms. The formation of condensate leads to the alkali attack and therefore to the dissolution of the network so that an increased alkali resistance would be desirable. In this context, reference can be made to the paper of M. Feldmann entitled "Untersuchung korrodierter Floatglasoberflächen" 66, DGG-Tagung, Fulda, May 1992. From this observation, one can derive that floated borosilicate glass should have a very high alkali resistance.

SUMMARY OF THE INVENTION

It is an object of the invention to provide new compositions of borosilicate glasses weak in boric acid having high chemical stability. It is another object of the invention to provide such compositions especially with a high alkali resistance in accordance with DIN 52 322 of LBK-Class 1, a low thermal expansion $\alpha_{20/300}$ between 4.0 and 5.3×10⁻⁶K⁻¹, a ratio $\alpha'/\alpha$ of the thermal expansion coefficients above $T_g(\alpha')$ to below $T_g(\alpha)$ of 4 to 8, a glass transformation temperature between 500° and 600° C., high radiation transmissibility and a UV-transmission $\tau_{250\ nm/1\ mm}$ of 0 to 70% or $\tau_{300\ nm/1\ mm}$ of 0 to 91%.

It is still another object of the invention to provide a borosilicate glass which can be chemically tempered above and below the transformation range for increasing the mechanical and thermal strength. It is another object of the invention to provide such a borosilicate glass which is thermally pretempered and can be produced having a high transmission in the UV, VIS and near IR in conventional and modern melting and processing methods such as the float process.

The borosilicate glass composition of the invention is weak in boric acid and has a high chemical stability. The glass composition includes in percent by weight on oxide basis: $SiO_2$>75; $B_2O_3$ 1 –<9; $Al_2O_3$ 3–6; $Li_2O$ 0–4; $Na_2O$ 0–8; $K_2O$ 0–6; MgO 0–3; CaO 0–3; BaO 0–2; SrO 0–2; ZnO 0–3; $ZrO_2$ 0–3; $SnO_2$ 0–3; SnO 0–3; $TiO_2$ 0–2; $CeO_2$ 0–2; $Fe_2O_3$ 0–1; with $SiO_2+B_2O_3$>83; $SiO_2$:$B_2O_3$>8; $SiO_2$+$Al_2O_3$+$ZrO_2$>83; $Li_2O$+$Na_2O$+$K_2O$ 5–10; MgO+CaO+BaO+SrO+ZnO≦3.

It was surprisingly found that glass compositions in the known borosilicate system $SiO_2$—$B_2O_3$—$Al_2O_3$—$M_2O$—MO can be melted which satisfy the above-mentioned complex objects if one knows and maintains specific special conditions with respect to the portions and ratios of the components. The range of compositions includes (in percent by weight on oxide basis) $SiO_2$>75; $B_2O_3$ 1 to <9; $Al_2O_3$ 3 to 6; $Li_2O$ 0 to 4; $Na_2O$ 0 to 8; $K_2O$ 0 to 6; MgO 0 to 3; CaO 0 to 3; BaO 0 to 2; SrO 0 to 2; ZnO 0 to 3; $ZrO_2$ 0 to 3; $SnO_2$ 0 to 3; SnO 0 to 3; $TiO_2$ 0 to 2; $CeO_2$ 0 to 2; $Fe_2O_3$ 0 to 1. In these ranges, glasses having a high alkali resistance are produced provided they contain as much glass forming substances as possible (sum $SiO_2+B_2O_3$>83 percent by weight), but large quantities of $SiO_2$ in proportion to $B_2O_3$ ($SiO_2$:$B_2O_3$>8) and simultaneously a high portion of $SiO_2$, $Al_2O_3$ and $ZrO_2$ (sum>83 percent by weight) with an alkali oxide content $Li_2O$+$Na_2O$+$K_2O$ of 5 to 10 percent by weight and no more than 3 percent by weight of MgO+CaO+BaO+SrO+ZnO.

$ZrO_2$ must not necessarily be introduced into the glass. If $ZrO_2$ is omitted, the removal pursuant to DIN 52 322 is approximately 65 to 70 mg/dm², that is, LBK-Class 1 is obtained. On the other hand, if one works with a concentration of approximately 1 to 2 percent by weight $ZrO_2$, the removal is reduced to values down to approximately 40 mg/dm² so that a very good alkali resistance, more specifically, a very high reserve of alkali resistance is realized.

By increasing the $ZrO_2$ portion above 2 percent by weight, sometimes melt residues occur which can no longer be dissolved when the $ZrO_2$ admixture is over 3 percent by weight and the UV-transmissibility of $\tau_{250\ nm/1\ mm}$ up to approximately 70% or $\tau_{300\ nm/1\ mm}$ up to approximately 91% (which is the highest for this system) cannot be obtained because $ZrO_2$ has a UV-absorption which cannot be ignored.

It has been further found that the increased alkali resistance correlates with the structure parameters of the borate groups. Raman spectroscopic investigations show that threefold coordinated boron ions are present in a conventional glass of the apparatus glass type G 20 (Table 2, Example 5) at 814 cm$^{-1}$ and fourfold coordinated boron ions are present at 780 cm$^{-1}$ and the BO$_3$ groups are at a somewhat greater amount at a ratio SiO$_2$:B$_2$O$_3$=6.8. Coordinate boron ions are explained, for example, in the text of M. Schmidt entitled "Anorganische Chemie", Volume 1, Bibliographisches Institut, Mannheim, pages 212 and 213 (1967).

By increasing the SiO$_2$:B$_2$O$_3$ ratio to, for example, 15.1 or 15.2 (see Table 5, Examples 5 and 6, respectively), the borate structure is changed in such a manner that the portion of BO$_4$ groups increases greatly and exceeds the BO$_3$ group portion by more than double. In these examples, it is unessential whether the alkali oxide is introduced primarily as, for example, Na$_2$O or K$_2$O. The structure and therefore the alkali resistance is apparently determined by the ratio SiO$_2$:B$_2$O$_3$ for constant portions of Al$_2$O$_3$, ZrO$_2$, MO and MO$_2$.

The alkali oxides Li$_2$O, Na$_2$O and K$_2$O should in the sum amount to 5 to 10 percent by weight in order to adjust the thermal expansion $\alpha_{20/300}$ in the range of 4.0 to $5.3 \times 10^{-6}$ K$^{-1}$. The thermal expansion can be influenced via the quantity of alkali oxides. In addition, the thermal expansion can be influenced via the type of alkali oxide. The largest $\alpha$-values are obtained with K$_2$O.

The alkali oxides furthermore influence the meltability and viscosity of the glass. In order to improve these characteristics, a content of at least 0.05 percent by weight of Li$_2$O is required. The crystallization stability of the glass is reduced to an unacceptable extent when there is more than 4 percent by weight Li$_2$O. It has been determined that the material costs caused by the Li$_2$O/Li$_2$CO$_3$ admixture can be considerably reduced by utilizing cost-effective lithium minerals such as special spodumenes and that introducing slight quantities of lithium compounds (more than 0.05 percent by weight) into the glass very favorably influences the melting and/or viscosity characteristics. With respect to the increased material costs referred to above, reference can be made, for example, to the publication entitled "Glass Industry", 69, Mar. 10, 1988, pages 18 to 25 or the article of Y. Tang et al entitled "Influence of Li$_2$O addition on viscosity and viscosity-dependent glass properties" published in Glastechnische Berichte, G3 (1990), pages 410 to 419.

The small lithium ions provide a good basis for a chemical tempering of the glass via ion exchange below the transformation temperature and quantities greater than 0.5 percent by weight Li$_2$O when exchanged for K$_2$O provide a noticeable increase of the electric volume resistivity and therefore of the electrical insulation capability of the glass below $T_g$. For these reasons, Li$_2$O is introduced additionally into the glass as an advantageous component. In this connection, reference can be made to publication "American Ceramic Society Bulletin", Volume 72, (1993), 4, pages 85 to 88.

When melting, it was determined that the glass can contain a relatively high quantity of Na$_2$O and K$_2$O with Li$_2$O portions of approximately 1 percent by weight. The concentrations of Li$_2$O 4 percent by weight of Na$_2$O 8 percent by weight and of K$_2$O 6 percent by weight (that is, their sum M$_2$O has to be 5 to 10 percent by weight) should not be exceeded in order to realize the pregiven thermal expansion, the high chemical stability and an adequate crystallization stability.

An adequate electrical conductivity of the melt for applying full-electric melt methods is given when the following condition is satisfied: the sum of Li$_2$O+Na$_2$O+K$_2$O is 5 to 10 percent by weight. However, a K$_2$O admixture is preferably omitted. The electrical insulating capability of the glasses according to the invention lies above 200° C. and is the same as for known borosilicate glasses of the apparatus glass type so that glass applications, for example, in the lamp industry, are possible, especially when a high $T_g$ value of almost 600° C. is realized. The electrical insulating capability is characterized by the $T_K$-100 value (temperature at which the specific electrical conductivity is K=100×10$^{-10-1}$cm$^{-1}$).

For producing glasses without residual radioactivity, K$_2$O and also ZrO$_2$ must be omitted.

Gamma radiation resistant glass can be produced in glass systems according to the invention in that small quantities of up to 2 percent by weight CeO$_2$ are introduced into the glass.

ZrO$_2$-containing refractory material is used conventionally for melting borosilicate glasses, for example, for bricks, which are poured in a molten condition and which have a ZrO$_2$ portion which is approximately 30, 40 or 90 percent by weight. An increased attack of Li$_2$O on this refractory material was not observed when Li$_2$O was introduced together with ZrO$_2$ into the glass when utilizing bricks having approximately 30 percent by weight ZrO$_2$.

The driving corrosion force "$C_s$-$C_o$" is reduced by ZrO$_2$ admixtures to the glass wherein:

$C_s$=is the saturation concentration of ZrO$_2$ in the glass and
$C_o$=is the concentration of ZrO$_2$ in the melt in accordance with glass synthesis; that is, the corrosion is reduced by the increase of $C_o$ for a glass type having a given $C_s$ and the corrosion possibly caused by Li$_2$O is compensated thereby.

It was further determined that only limited quantities of earth alkali oxides (MgO, CaO, SrO, BaO, ZnO) can be introduced into the glass to increase the transformation temperature because otherwise, the phase separation, which is always observable in borosilicate glasses, is increased to an impermissible extent, which, in turn, can have negative effects on the chemical stability and primarily on the hydrolytic stability.

The content of earth alkali oxides can, however, be up to 3 percent by weight for special applications such as for high-power lamps which are subjected to intense thermal loading and which have high transformation temperatures of up to approximately 600° C.

Otherwise, earth alkali oxides (MO) can, in general, be omitted except when, for example, small quantities of BaO or CaO, which are introduced as melt accelerators (for example, as fluorides), produce positive effects.

If the glass according to the invention is to have a low X-ray absorption, then relatively heavy glass components such as ZrO$_2$, SrO, BaO, ZnO must be omitted or, for the alkali oxides, K$_2$O must likewise be omitted.

The use of SrO as a glass component is, however, limited to exceptions because of the high cost.

If the new glass is used to provide glass ampules for the pharmaceutical industry, then the glass should contain no or only minute quantities of BaO in order to prevent possible precipitations of BaSO$_4$ in the injection solution.

Up to 3 percent by weight of tin oxide can be added to the glass to further increase the chemical stability without disadvantageous melt residues occurring.

The melt can be adjusted to be additionally reducing by utilizing covalent tin compounds in order, for example, to obtain a reduction from Fe$^{3+}$ to Fe$^{2+}$ for increasing the UV transmission or for improved solarization stability.

For applications which especially require UV non-transmitting glass, strong UV absorbers such as TiO$_2$ and/or Fe$_2$O$_3$ can be added to the glass. The quantity is dependent upon the position of the desired UV edge so that approximately 2 percent by weight TiO$_2$ and/or up to 1 percent by weight Fe$_2$O$_3$ are adequate.

Known compounds such as fluorides and/or chlorides can be added to the batch as fluxing agents or refining agents up to portions of 4 percent by weight. The use of fluorides is then additionally advantageous when the viscosity of the glass is to be reduced.

It is apparent that within the area of the glass composition according to the invention, many synthesis variations are possible for optimizing special characteristics in dependence upon the applicational purpose of the glass.

In the following, the invention is explained in greater detail in the context of selected examples.

In Table 5, laboratory melts are listed which are characterized by their glass syntheses, component portions and component ratios and by their physical and chemical characteristics.

In all cases, the portion of the glass formers (the sum of $SiO_2+B_2O_3$) is more than 83 percent by weight, the portion of $SiO_2$ to $B_2O_3$ is greater than 8 and the sum of $SiO_2+Al_2O_3+ZrO_2$ is more than 83 percent by weight so that the desired excellent alkali resistance (class 1) is obtained notwithstanding otherwise very different contents of $Li_2O$, $Na_2O$ and $K_2O$.

As shown by the removal of 68 to 41 mg/dm$^2$, the alkali attack can be varied over the glass composition in a wide range.

The glasses having a removal of approximately 40 mg/dm$^2$ are comparable to the alkali resistance of quartz glass because, for quartz glass, a removal of 35 mg/dm$^2$ was determined when measured under the same conditions according to DIN 52 322.

Oxide multicomponent glasses having reduced $ZrO_2$ concentrations of 1 to 2 percent by weight, which can be melted with good quality and without difficulty and are resistant to alkali solutions in the manner of quartz glass, are not known up until now.

All of the listed glasses furthermore realize the hydrolytic Class HBK 1 (in accordance with DIN 12 111) and the acid resistant Class SBK 1 (according to DIN 12 116).

Table 5 further shows that thermal expansion can be adjusted in the range of 4.1 to 5.3×10$^{-6}$K$^{-1}$ via the quantity and the type of alkali oxide. In this way, thermal stability or stability in the presence of temperature changes is obtained up to approximately 145 K.

The separation tendency cannot be entirely avoided for borosilicate glasses and this tendency is increased with large concentrations of $Li_2O$ so that glasses which are subjected to extreme temperature loads after the melting process should contain only relatively slight portions of less than approximately 1 percent by weight $Li_2O$.

With the ratio $\alpha':\alpha=5.2$ to 7.2, the examples of Table 5 furthermore show that the glasses have an excellent basis for thermal pretempering and that $T_g$-values of approximately 500° C. to approximately 600° C. can be adjusted so that applications as glass for lamps under increased thermal load are possible or that annealing of glass such as X-ray tube glasses at increased temperature is possible.

The values computed for the temperature-change stability are designated as TWB-values for glass which has not been pretempered. E-value and μ-values are assumed. The TWB-values between 107 and 145K show that R-values, which are required for simple applications such as slightly loaded glasses for home use, of approximately 110K are realized and that the TWB-values, which are necessary for more demanding applications such as laboratory glasses and melt glasses, of approximately 140K are realized.

In the following, Example 4 of Table 5 of the invention is compared to the commercial universal glass DURAN™ which represents the internationally specified type of borosilicate glass 3.3 (DIN-ISO 3585).

With the same hydrolytic and acid resistance as DURAN™, the embodiment of Example 4 realizes an alkali resistance more than twice that of DURAN™. This was shown by a 55 mg/dm$^2$ alkali removal for Example 4 compared to a removal of approximately 130 mg/dm$^2$ for DURAN™.

The new glass has a very significantly higher alkali resistance. For this reason, the new glass is better than DURAN™ for the following: new applications, finishing steps of further processing (for example, coating) or the storage of floated glass discs causing alkali attack.

A comparison of the viscosities in the lower temperature range and the viscosity in the upper temperature range is presented below:

|  | DURAN ™ | Example 4 |
| --- | --- | --- |
| $T_g$ (°C.) | 530 | 568 |
| $Z_1$ (°C.) | 785 | 791 |
| $V_A$ (°C.) | 1270 | 1260 | wherein the viscosities in the temperature range can be characterized, for example, by the transformation temperature $T_g$ and the viscosity temperature $Z_1$ (corresponding approximately to log η=8.4) and wherein the viscosity in the upper temperature range is characterized by the working temperature $V_A$ (working point, corresponds to T, where log η=4).

The above comparison permits the statement to be made that the example of the invention has greater thermal stability in the lower temperature range and, at the same time, has lower viscosities in the upper temperature range so that it is simpler to process and to melt.

It is clear that an increase of the permissible use temperature and an abrupt increase of the resistance against the attack of alkaline agents permit new possibilities of application of the glass according to the invention. Such possibilities include, for example, the use for exhaust gas lines which are subjected to hot aggressive condensates. The known stability of DURAN™ with respect to chemical attack even for longer durations of exposure and increased temperature is further improved so that the glass of the invention with respect to its chemical stability exceeds that of most metals and other materials. The new glass exemplified by Example 4 of Table 5 has an improved melt performance compared to DURAN™ and the viscosities in the high temperature range are reduced and in the low temperature range increased. For this reason, an improved production according to the float method can be expected.

However, DURAN™ is superior to the boric acid weak borosilicate glass of the invention because of its minimum thermal expansion of $\alpha_{20/300}=3.3\times10^{-6}K^{-1}$ with respect to the TWB with approximately 190K.

When the glass compositions of the glasses of the invention are, however, so selected that relatively small thermal expansions of $\alpha_{20/300}$ of approximately 4.0 to 4.2×10$^{-6}$K$^{-1}$ are realized, then also TWB-values of approximately 135K to 150K are obtained which are adequately high for most applications.

The thermal expansion values increased in comparison to DURAN™ together with the essentially changed ratio $\alpha':\alpha$ (increase from 3.8 to, for example, 6.8 of Example 4) impart to the new glasses the special property of significantly improved specific thermal strengthening capability.

The surface pressure tension which can be increased in this manner, forms, in turn, the basis for the use of the glass as fire protective glass having a high mechanical strength. The glass of the invention is therefore better suited than DURAN™ for the manufacture as float glass with subsequent thermal strengthening and use as fire protective glass.

An estimate of the thermal tension factors for pretempered glass yields that the new glasses compared to DURAN™ have similar good properties. For the same values of the base strengths of the glasses, the transverse contraction numbers and the moduli of elasticity, the thermal tension factor is influenced only by the pressure tempering introduced by the tempering and the thermal expansion. R increases with the increase of the bending tensile stress with increasing thermal expansion and increased thermal expansion simultaneously reduces the R-value. For this reason, the thermal tension factors of the glasses of the invention are in the same order of magnitude as DURAN™ so that the same excellent performance is to be expected with a partial heating of the glass.

The excellent radiation transmittance in the entire range of sun radiation is noted as a further special property of the new glasses of the invention. The borosilicate glasses weak in boric acid realize a high radiation transmission in the wavelength range of approximately 250 to approximately 2700 nm when these borosilicate glasses are melted without or with only slight portions of earth alkali oxides or $ZrO_2$. Accordingly, these glasses can be utilized, for example, in solar collectors.

Figure 1:
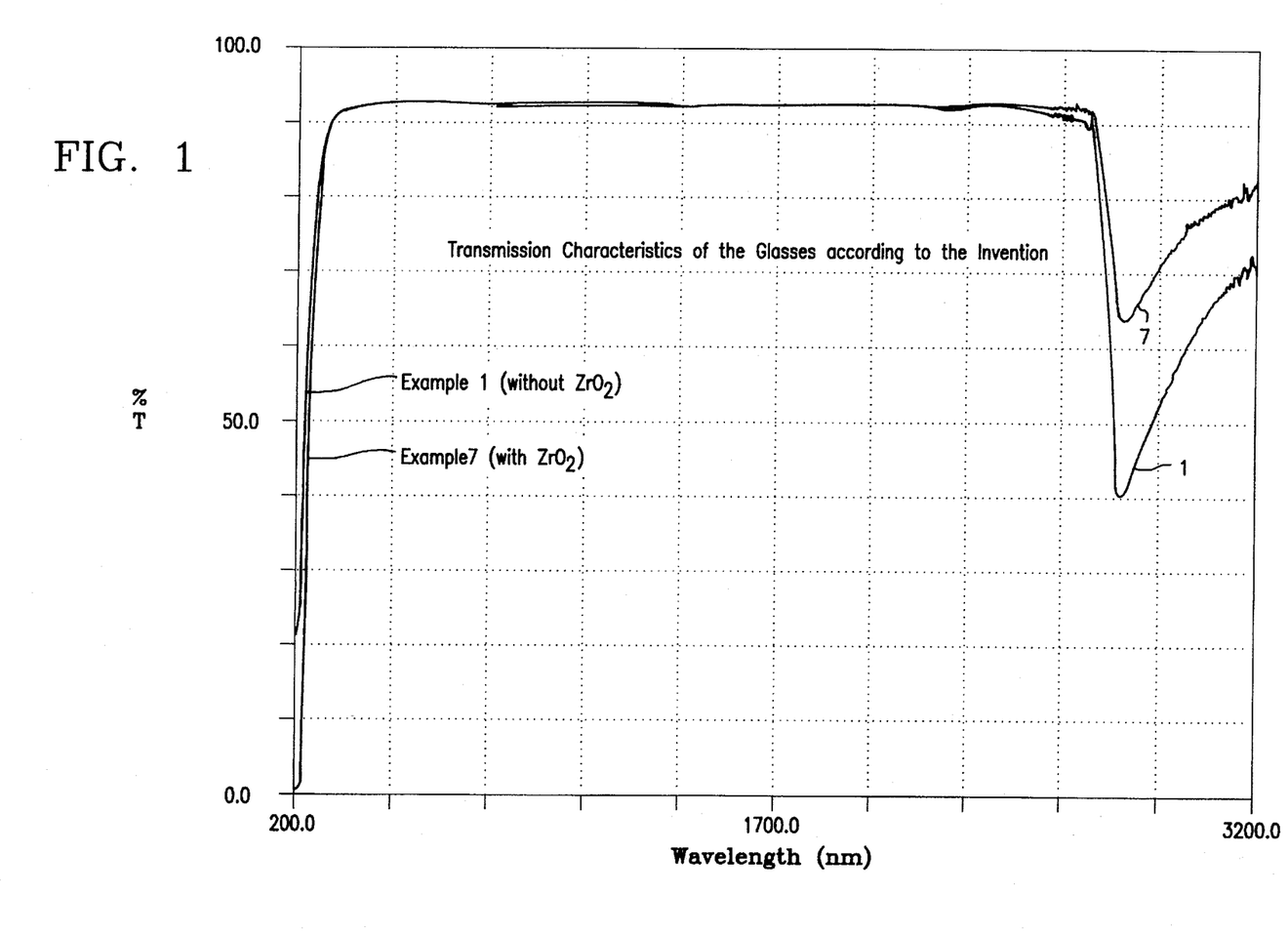
FIG. 1 shows light transmittance values for a 1 mm thick glass sample made from raw materials weak in iron.

When the glass is melted with raw materials weak in iron, the light transmittance values are obtained which are shown in FIG. 1. The curve 1 is plotted for Example 1 (the total of earth alkali oxides equals 0.5 percent by weight without $ZrO_2$ admixture) and the curve 2 is taken from Example 7 (sum of earth alkali oxides=0.5 percent by weight, $ZrO_2$-concentration=1.6%-wt) for 1 mm layer thickness.

The new glasses are very well suited for photochemical applications which take place in the range of 280 to 400 nm (for example, chlorination and sulfochlorination) because, and in contrast to DURAN™, the maximum possible UV transparency of approximately 91% is obtained up to approximately 300 nm.

The glasses according to the invention have an excellent resistance with respect to attack of alkali agents. For this reason, they can be used in powder form as an admixture for frits or ceramic glazes to improve their otherwise inadequate resistance to alkalis. The glass of the invention can also be used as an admixture for color systems or white systems because the glass according to the invention can be produced without absorption losses in the UV, visible and near infrared ranges. The same applies for color systems when the glass according to the invention has been appropriately previously colored.

The new glasses have excellent crystallization stability. They satisfy the empirically determined conditions of crystallization stability known for alkali-containing borosilicate glasses.

For Example 4 of the invention, which is free of $K_2O$, the following crystallization properties were determined after three-hour tempering in the horizontal gradient oven: crystallization in the range of approximately 700° to 1130° C., maximum crystal growth speed approximately 50 μm/hour at approximately 960° C. (T at $KG_{max}$). That is, the working temperature ($V_A$=1260° C.) is approximately 130° C. above the liquid temperature $T_L$. Under the same measurement conditions, the following values were determined for the Example 5 of the invention which contains $K_2O$: crystallization range approximately 700° to 1115° C., $KG_{max}$ approximately 50 μm/hour, T($KG_{max}$) approximately 1000° C. For this glass too, the stability condition applied in practice, $V_A$-$T_L$>100° C., was well satisfied at approximately 180° C.

The new glasses have excellent properties also with respect to the separation tendency. A practical standard for judging separation performance is defined by the change of the hydrolytic stability during tempering.

The glass of Example 4 of Table 5 according to the invention was again heated to 670° C. after casting and cooling and held for two hours at this temperature ($T_g$+100° C.). The measurement of hydrolytic stability according to DIN 1211 provided the following results.

Example 4 before tempering: HBK=1 with 6.2 μg $Na_2O$/g glass grit

Example 4 after tempering: HBK=1 with 9.3 μg $Na_2O$/g glass grit.

Since the first hydrolytic class is determined up to a removal of 31 μg $Na_2O$/g glass grit, the new glass realizes a reliable HBK 1 also after tempering. As a comparison, it is noted that a glass of the type of the borosilicate glass 3.3 has a reduction of the hydrolytic stability from approximately 12 to approximately 34 μg $Na_2O$/g glass grit imparted by tempering for two hours at 630° C. ($T_g$+100° C.).

The observation that very separation stable new glasses can be melted in the range of glass compositions according to the invention is affirmed by electron microscopic recordings. Thus, the glasses number 1 and number 4 of Table 5, for example, show, after four-day tempering, the same or very similar images compared to conventional JENA$^{er}$ apparatus glass type and to DURAN™.

The glasses of Table 5 of the invention were melted in the laboratory in a mid frequency heated oven or a SUPER-KANTHAL™ rod heated oven in platinum or quartz crucibles at air atmosphere in a temperature range of 1550° C. to 1630° C. The melting time amounted to approximately four to five hours, the melt volume was approximately 1 liter and the meltings were homogenized after refining. Fluorides and chlorides were used as refining agents, preferably 1 to 2%-wt NaCl. When fluorides were used, they were preferably introduced into the batch as $CaF_2$ and/or $BaF_2$. As glass raw materials, the following were used: preferably $SiO_2$ which was, in part, weak in iron, $H_3BO_3$, $Al(OH)_3$, $ZrO_2$, alkali carbonates and earth alkali carbonates or nitrates, ZnO, SnO and $SnO_2$.

The tables referred to herein show compositions of borosilicate glasses and the physical and chemical properties resulting therefrom and are described below.

Table 1 lists known borosilicate glasses of high thermal and chemical stability having $\alpha_{20/300}$<5.0×10$^{-6}$K$^{-1}$. The stability (TWB) in the presence of temperature change was computed in the following way: TWB=$\sigma_B$(1–μ)/α.E (corresponds to $\Delta T_{max}$ which a body can still withstand). Here the following assumptions were made:
$\sigma_B$=bending tensile strength=50 N/mm$^2$ (not pretempered);
μ=poisson's ratio=0.2; and,
E=young's modulu=70×10$^3$ N/mm$^2$.

Table 2 lists known borosilicate glasses of high thermal and chemical stability having a ratio $SiO_2$ to $B_2O_3$ of less than 8 (%-wt).

Table 3 lists additional examples of known borosilicate glasses.

Table 4 lists examples of borosilicate glasses known from German Patent 2,756,555.

Table 5 shows examples of boric acid weak borosilicate glasses according to the invention.

It is to be understood that the foregoing description is that of the preferred embodiments of the invention and that various changes and modifications may be made thereto without departing from the spirit and scope of the invention as defined in the appended claims.

TABLE 1

Known borosilicate glasses of high thermal and chemical stability wherein $\alpha_{20/300} < 5.0 \times 10^{-6} K^{-1}$
(glass compositions in %-wt)

|  | DURAN™ 8330 | JENA$^{er}$ G 20 | SUPRAX™ 8486 | JENA$^{er}$ Ggl/490/5 | FIOLAX™ 8412 | SUPRAX™ 8488 |
|---|---|---|---|---|---|---|
| $SiO_2$ | 80.0 | 75.5 | 75.5 | 73.2 | 74.7 | 74 |
| $B_2O_3$ | 13.0 | 9.0 | 11.5 | 11.0 | 10.0 | 12 |
| $Al_2O_3$ | 2.5 | 5.0 | 4.0 | 5.3 | 5.0 | 4 |
| $Na_2O$ | 3.5 | 5.3 | 4.0 | 7.0 | 6.5 | 7 |
| $K_2O$ | 1.0 | 1.2 | 1.0 | 0.2 |  |  |
| MgO |  |  |  | 0.5 |  |  |
| CaO |  | 0.4 | 1.0 | 0.8 | 1.5 |  |
| BaO |  | 3.6 | 2.5 | 2.5 | 2.0 | 1 |
| F |  |  |  |  | 0.3 | 1 |
| $ZrO_2$ |  |  |  |  |  | 1 |
|  | 100.0 | 100.0 | 100.0 | 100.0 | 100.0 | 100.0 |
| $SiO_2 + B_2O_3$ | 93.0 | 84.5 | 87.0 | 84.2 | 84.7 | 86 |
| $SiO_2:B_2O_3$ | 6.2 | 8.4 | 6.6 | 6.7 | 7.5 | 6.2 |
| $SiO_2 + Al_2O_3 + ZrO_2$ | 82.5 | 80.5 | 79.5 | 78.5 | 79.7 | 79 |
| MgO + CaO + BaO | — | 4.0 | 3.5 | 3.3 | 3.5 | 1 |
| $\rho \cdot g/cm^3$ | 2.23 |  | 2.34 | 2.35 | 2.39 | 2.30 |
| $\alpha_{20/300} 10^{-6} K^{-1}$ | 3.25 | 4.9 | 4.1 | 4.9 | 4.9 | 4.3 |
| $T_g$ (°C) | 530 | 569 | 550 | 560 | 560 | 545 |
| $V_A$ (°C) | 1270 |  | 1230 | 1160 | 1160 | 1205 |
| HBK DIN 12 111 | 1 | 1 | 1 | 1 | 1 | 1 |
| SBK DIN 12 116 | 1 | 1 | 1 | 1 | 1 | 1 |
| LBK DIN 52 322 | 2 | 2 | 2 | 2 | 2 | 2 |
| TWB X | 192 | 116 | 147 | 116 | 111 | 138 |
| E $10^3$ N/mm$^2$ | 63 | 70 | 66 | 70 | 73 | 67 |

TABLE 2

Examples of known borosilicate glasses of high thermal and chemical stability having a ratio $SiO_2$ to $B_2O_3$ of less than 8
(glass compositions in %-wt)

|  | Ex. 1 | Ex. 2 | Ex. 3 | Ex. 4 | Ex. 5 |
|---|---|---|---|---|---|
| $SiO_2$ | 73.2 | 74.7 | 74.2 | 74.7 | 75.6 |
| $B_2O_3$ | 11.0 | 11.0 | 10.9 | 11.0 | 11.1 |
| $Al_2O_3$ | 5.3 | 4.7 | 4.7 | 4.4 | 4.4 |
| $Li_2O$ | — | 0.3 | 0.3 | 0.6 | 0.5 |
| $Na_2O$ | 7.0 | 6.6 | 6.5 | 6.3 | 6.4 |
| $K_2O$ | 0.2 | — | — | — | — |
| CaO | 0.8 | 0.5 | 0.5 | 0.3 | 0.3 |
| BaO | 2.5 | 1.0 | 1.0 | 1.0 | 0.2 |
| $ZrO_2$ | — | 1.0 | 1.7 | 1.7 | 1.5 |
| Residue | — | 0.2 | 0.2 | — | — |
|  | 100.0 | 100.0 | 100.0 | 100.0 | 100.0 |
| $SiO_2 + B_2O_3$ | 84.2 | 85.7 | 85.1 | 85.7 | 86.7 |
| $SiO_2:B_2O_3$ | 6.7 | 6.8 | 6.8 | 6.8 | 6.8 |
| $SiO_2 + Al_2O_3 + ZrO_2$ | 78.5 | 80.4 | 80.6 | 80.8 | 81.5 |
| $Li_2O + Na_2O + K_2O$ | 7.2 | 6.9 | 6.8 | 6.9 | 6.9 |
| CaO + BaO | 3.3 | 1.5 | 1.5 | 1.3 | 0.5 |
| LBK DIN 52 322 | 2 2 | 2 2 | 2 1 | 1 1 | 1 2 |
| Removal (mg/dm$^2$) | 100 80 | 83 | 75 70 | 74 | 79 |

TABLE 3

Examples of known borosilicate glasses (in %-wt)
German Patent 4,230,607

|  | DE-AS 2818804 | 21 | 27 | 28 | 29 | 30 | 31 | 41 | GB-PS 791374 Ex. 2 | SU-PS 675010 | SU-PS 424825 | DE-PS 767476 Ex. E | JP-PS 4-33741 Ex. 2 |
|---|---|---|---|---|---|---|---|---|---|---|---|---|---|
| $Si_2O$ | 72.6 | 76.4 | 77.60 | 75.5 | 75.45 | 75.90 | 75.05 | 74.2 | 74.7 | 77.5 | 76.2 | 80.1 | 76.5 |
| $B_2O_3$ | 12.38 | 12.0 | 9.00 | 10.0 | 10.00 | 10.00 | 10.00 | 11.1 | 11.5 | 3.5 | 12.3 | 11.4 | 12.7 |
| $Al_2O_3$ | 1.08 | 1.5 | 1.50 | 5.0 | 2.50 | 2.00 | 2.50 | 2.9 | 1.5 | 4.0 | 2.8 | 2.1 | 3.8 |
| $Na_2O$ | 6.6 | 3.6 | 2.50 | 6.0 | 2.00 | 2.20 | 2.00 | 1.7 | 5.0 | 5.5 | 2.2 | 5.7 | 6.6 |
| $K_2O$ | 0.47 | 1.0 | 2.95 |  | 3.60 | 3.45 | 4.00 | 3.8 |  | 4.0 | 1.0 | 0.6 | 0.2 |
| MgO | 2.58 | 0.8 |  |  |  | 2.35 |  |  |  |  | $Li_2O$ 1.0 | $Li_2O$ 0.1 |  |
| CaO | 4.0 | 3.0 | 2.35 | 1.5 | 2.35 |  | 2.35 | 2.7 | $CaF_2$ 1.0 |  | 0.5 |  |  |

TABLE 3-continued

Examples of known borosilicate glasses (in %-wt)
German Patent 4,230,607

|  | DE-AS 2818804 | 21 | 27 | 28 | 29 | 30 | 31 | 41 | GB-PS 791374 Ex. 2 | SU-PS 675010 | SU-PS 424825 | DE-PS 767476 Ex. E | JP-PS 4-33741 Ex. 2 |
|---|---|---|---|---|---|---|---|---|---|---|---|---|---|
| BaO | | 0.6 | | 2.0 | | 1.60 | | | | 4.5 | 3.5 | | |
| ZnO | | | 1.60 | | 1.60 | | 1.60 | 1.6 | | 1.0 | 0.5 | | |
| $ZrO_2$ | | 1.1 | 2.50 | | 2.50 | 2.50 | 2.50 | 2.0 | 4.7 | | | | |
| Residue | 0.29 | | | | | | | | | | | | 0.2 |
|  | 100.00 | 100.0 | 100.00 | 100.0 | 100.00 | 100.00 | 100.00 | 100.0 | 98.4 | 100.0 | 100.0 | 100.0 | 100.0 |
| $SiO_2 + B_2O_3$ | 84.98 | 88.4 | 86.6 | 85.5 | 85.45 | 85.90 | 85.05 | 85.3 | 86.2 | 81.0 | 88.5 | 91.5 | 89.2 |
| $SiO_2:B_2O_3$ | 5.90 | 6.4 | 8.6 | 7.6 | 7.5 | 7.6 | 7.5 | 6.7 | 6.5 | 22.1 | 6.2 | 7.0 | 6.0 |
| $SiO_2 + Al_2O_3 + ZrO_2$ | 73.68 | 79.0 | 81.6 | 80.5 | 80.45 | 80.4 | 80.05 | 79.1 | 80.9 | 81.5 | 79.0 | 82.2 | 80.3 |
| MgO + CaO + BaO + ZnO | 6.58 | 4.4 | 3.95 | 3.5 | 3.95 | 3.95 | 3.95 | 4.3 | 1.0 | 5.5 | 4.5 | 0 | 0 |
| $\alpha_{20/300}(10^{-6}K^{-1})$ | 5.45ˣ | 3.98 | 3.95 | 4.65 | 3.98 | 4.07 | 4.19 | 4.25 | 3.94 | — | — | 4.3 | 4.5 |

ˣ$\alpha_{20/550}(10^{-6}K^{-1})$

TABLE 4

Examples of known borosilicate glasses (in %-wt)
U.S. Pat. No. 4,259,118

|  | 2 | 3 | 4 | 6 | 7 | 8 | 10 | 11 |
|---|---|---|---|---|---|---|---|---|
| $SiO_2$ | 78.5 | 78.50 | 78.5 | 78.50 | 78.5 | 78.5 | 78.50 | 77.5 |
| $B_2O_3$ | 8.5 | 5.40 | 8.0 | 6.10 | 5.1 | 6.5 | 5.10 | 5.1 |
| $Al_2O_3$ | 4.0 | 3.50 | 3.5 | 3.50 | 3.5 | 3.5 | 3.50 | 3.5 |
| $Na_2O$ | 4.0 | 5.00 | 5.5 | 5.00 | 5.3 | 5.5 | 5.30 | 5.3 |
| CaO | 1.8 | — | 1.5 | 2.40 | 3.0 | 2.4 | — | 3.0 |
| MgO | 1.2 | — | 1.0 | 1.70 | 2.1 | 1.6 | — | 2.1 |
| BaO | 2.0 | 2.50 | 2.0 | 2.80 | — | 2.0 | 7.60 | 2.0 |
| ZnO | — | 5.10 | — | — | 2.5 | — | — | $ZrO_2$ 1.5 |
| $As_2O_3$ | 0.5 | 0.15 | 0.5 | 0.25 | — | — | 0.25 | — |
| NaCl | 0.5 | 0.70 | — | 0.75 | 0.5 | 0.5 | 0.60 | 0.5 |
|  | 101.0 | 100.85 | 100.5 | 101.00 | 100.5 | 100.5 | 100.85 | 100.5 |
| $SiO_2 + B_2O_3$ | 87.0 | 83.9 | 86.5 | 84.6 | 83.6 | 85.0 | 83.6 | 82.6 |
| $SiO_2:B_2O_3$ | 9.2 | 14.5 | 9.8 | 12.9 | 15.4 | 12.1 | 15.4 | 15.2 |
| $SiO_2 + Al_2O_3 + ZrO_2$ | 82.5 | 82.0 | 82.0 | 82.0 | 82.0 | 82.0 | 82.0 | 82.5 |
| Σ MO | 5.0 | 7.6 | 4.5 | 6.9 | 7.6 | 6.0 | 7.6 | 7.1 |
| $\alpha_{20/300}(10^{-6}K^{-1})$ | 3.85 | 4.19 | 4.36 | 4.49 | 4.54 | 4.58 | 4.66 | 4.67 |

|  | 12 | 13 | 14 | 15 | 17 | 18 | 19 |
|---|---|---|---|---|---|---|---|
| $SiO_2$ | 78.5 | 78.50 | 77.0 | 78.5 | 78.50 | 77.00 | 75.50 |
| $B_2O_3$ | 5.1 | 4.10 | 5.1 | 2.5 | 1.00 | 4.10 | 5.10 |
| $Al_2O_3$ | 3.5 | 3.50 | 5.0 | 3.5 | 3.50 | 3.50 | 3.50 |
| $Na_2O$ | 5.3 | 5.30 | 5.3 | 5.3 | 5.30 | 5.80 | 5.30 |
| CaO | 3.0 | 2.40 | 3.0 | 2.4 | 2.40 | — | 3.00 |
| MgO | 2.1 | 1.70 | 2.1 | 1.7 | 1.70 | — | 2.10 |
| BaO | 2.5 | 4.50 | 2.5 | 6.1 | 7.60 | 9.60 | 5.50 |
| ZnO | — | — | — | — | — | — | — |
| $As_2O_3$ | 0.3 | 0.25 | — | 0.3 | 0.25 | 0.25 | 0.25 |
| NaCl | 0.5 | 0.60 | 0.5 | 0.5 | 0.60 | 0.60 | 0.60 |
|  | 100.8 | 100.85 | 100.5 | 100.8 | 100.85 | 100.85 | 100.85 |
| $SiO_2 + B_2O_3$ | 83.6 | 82.6 | 82.1 | 81.0 | 79.5 | 81.1 | 80.6 |
| $SiO_2:B_2O_3$ | 15.4 | 19.1 | 15.1 | 31.4 | 78.5 | 18.8 | 14.8 |
| $SiO_2 + Al_2O_3 + ZrO_2$ | 82.0 | 82.0 | 82.0 | 82.0 | 82.0 | 80.5 | 79.0 |
| Σ MO | 7.6 | 8.6 | 7.6 | 10.2 | 11.7 | 9.6 | 10.6 |
| $\alpha_{20/300}(10^{-6}K^{-1})$ | 4.71 | 4.75 | 4.82 | 4.88 | 5.00 | 5.03 | 5.09 |

TABLE 5

Examples of low boron borosilicate glasses according to the invention
(glass compositions in %-wt)

|  | Ex. 1 | Ex. 2 | Ex. 3 | Ex. 4 | Ex. 5 | Ex. 6 | Ex. 7 |
|---|---|---|---|---|---|---|---|
| $SiO_2$ | 80.4 | 77.8 | 79.0 | 78.1 | 80.0 | 80.5 | 80.4 |
| $B_2O_3$ | 7.0 | 8.9 | 7.7 | 8.3 | 5.3 | 5.3 | 3.2 |
| $Al_2O_3$ | 4.7 | 4.4 | 4.6 | 4.4 | 4.7 | 4.8 | 4.7 |
| $Li_2O$ | 0.5 | 0.5 | 0.7 | 0.5 | 1.3 | 0.5 | 2.7 |
| $Na_2O$ | 6.9 | 6.4 | 6.7 | 6.6 | 2.6 | 6.8 | 6.9 |
| $K_2O$ | — | — | — | — | 4.0 | — | — |
| CaO | 0.3 | 0.3 | 0.3 | 0.3 | 0.3 | 0.3 | 0.3 |
| BaO | 0.2 | 0.2 | 0.2 | 0.2 | 0.2 | 0.2 | 0.2 |
| $ZrO_2$ | — | 1.5 | 0.8 | 1.6 | 1.6 | 1.6 | 1.6 |
|  | 100.0 | 100.0 | 100.0 | 100.0 | 100.0 | 100.0 | 100.0 |
| $SiO_2 + B_2O_3$ | 87.4 | 86.7 | 86.7 | 86.4 | 85.3 | 85.8 | 83.6 |
| $SiO_2:B_2O_3$ | 11.5 | 8.7 | 10.3 | 9.4 | 15.1 | 15.2 | 25.1 |
| $SiO_2 + Al_2O_3 + ZrO_2$ | 85.1 | 83.7 | 84.4 | 84.1 | 86.3 | 86.9 | 86.7 |
| $Li_2O + Na_2O + K_2O$ | 7.4 | 6.9 | 7.4 | 7.1 | 7.9 | 7.3 | 9.6 |
| CaO + BaO | 0.5 | 0.5 | 0.5 | 0.5 | 0.5 | 0.5 | 0.5 |
| $\rho \cdot g/cm^3$ | 2.31 | 2.31 | 2.31 | 2.31 | 2.33 | 2.32 | 2.35 |
| $\alpha_{20/300} 10^{-6} K^{-1}$ | 4.2 | 4.1 | 4.2 | 4.1 | 4.4 | 4.1 | 5.3 |
| $\alpha':\alpha_{20/300}$ | 7.2 | 6.7 | 7.0 | 6.8 | 6.5 | 5.2 | 5.5 |
| $T_g$ (°C.) | 561 | 562 | 560 | 568 | 552 | 586 | 516 |
| $V_A$ (°C.) | 1264 | 1255 | 1260 | 1260 | 1294 | — | — |
| LBK DIN 52 322 | 1 | 1 | 1 | 1 | 1 | 1 | 1 |
| Removal $mg/dm^2$ | 68 | 64 | 62 | 55 | 48 | 46 | 41 |
| TWB °C. | 142 | 145 | 142 | 145 | 135 | 145 | 107 |
| E $10^3 N/mm^2$ | 67 | 67 | 67 | 67 | 67 | 67 | 70 |
| μ | 0.2 | 0.2 | 0.2 | 0.2 | 0.2 | 0.2 | 0.2 |

What is claimed is:

1. A borosilicate glass composition weak in boric acid having a high chemical stability, an alkali resistance in accordance with DIN 52322 of LBK-Class 1, a radiation transmittance and a UV transmission $\tau_{250\ nm/1\ mm}$ of 0 to 70% or $\tau_{300\ nm/1\ mm}$ of 0 to 91% a thermal expansion $\alpha_{20/300}$ between $4.0-5.3 \times 10^{-6} K^{-1}$, a ratio $\alpha'/\alpha$ of the thermal expansion coefficients above $T_g(\alpha')$ to below $T_g(\alpha)$ of 4 to 8, and, a glass transformation temperature between 500° C. and 600° C., said glass composition comprising in percent by weight on oxide basis:

| $SiO_2$ | >75 |
|---|---|
| $B_2O_3$ | 1–<9 |
| $Al_2O_3$ | 3–6 |
| $Li_2O$ | 0–4 |
| $Na_2O$ | 0–8 |
| $K_2O$ | 0–6 |
| MgO | 0–3 |
| CaO | 0–3 |
| BaO | 0–2 |
| SrO | 0–2 |
| ZnO | 0–3 |
| $ZrO_2$ | 0–3 |
| $SnO_2$ | 0–3 |
| SnO | 0–3 |
| $TiO_2$ | 0–2 |
| $CeO_2$ | 0–2 |
| $Fe_2O_3$ | 0–1 |
| with |  |
| $SiO_2 + B_2O_3$ | >83 |
| $SiO_2:B_2O_3$ | >8 |
| $SiO_2 + Al_2O_3 + ZrO_2$ | >83 |
| $Li_2O + Na_2O + K_2O$ | 5–10 |
| $MgO + CaO + BaO + SrO + ZnO$ | ≦3. |

2. The borosilicate glass composition of claim 1, wherein $Li_2O$ is within the range 0.05–4 and $ZrO_2$ is within the range 0.5–3.

3. The borosilicate glass composition of claim 1 comprising, in percent by weight on oxide basis:

| $SiO_2$ | 77.0–81.5 |
|---|---|
| $B_2O_3$ | 3.0–8.9 |
| $Al_2O_3$ | 3.5–5.5 |
| $Li_2O$ | 0.3–3.0 |
| $Na_2O$ | 2.0–7.5 |
| $K_2O$ | 0–5.0 |
| MgO | 0–2.0 |
| CaO | 0–2.0 |
| BaO | 0–1.0 |
| ZnO | 0–2.0 |
| $ZrO_2$ | 0.5–2.0 |
| $SnO_2$ | 0–2.0 |
| SnO | 0–2.0 |
| $Fe_2O_3$ | 0–1.0 |
| $TiO_2$ | 0–2.0 |
| with |  |
| $SiO_2 + B_2O_3$ | >83 |
| $SiO_2:B_2O_3$ | >8 |
| $SiO_2 + Al_2O_3 + ZrO_2$ | >83 |
| $Li_2O + Na_2O + K_2O$ | 7–10 |
| $MgO + CaO + BaO + SrO + ZnO$ | ≦3. |

4. The borosilicate glass composition of claim 2, having a UV-transmission $\tau_{250\ nm/1\ mm}$ of 0 to 60% or $\tau_{300\ nm/1\ mm}$ of 0 to 90%.

5. The borosilicate glass composition of claim 1 further comprising up to 1%-wt individually or in combination of at least one of the following: $As_2O_3$, $Sb_2O_3$ and PbO.

6. The borosilicate glass composition of claim 1, comprising in percent by weight on oxide basis:

| $SiO_2$ | 79.0–81.0 |
|---|---|
| $B_2O_3$ | 6.0–8.0 |
| $Al_2O_3$ | 3.5–5.0 |
| $Li_2O$ | 0.3–0.8 |
| $Na_2O$ | 6.0–8.0 |
| $K_2O$ | 0–3.0 |
| CaO | 0–1.0 |
| BaO | 0–1.0 |
| $SnO_2$ | 0–1.0 |

-continued

| | |
|---|---|
| SnO | 0–1.0 |
| $Fe_2O_3$ | 0–1.0 |
| $TiO_2$ | 0–2.0 |
| with | |
| $SiO_2 + B_2O_3$ | >85 |
| $SiO_2:B_2O_3$ | >9 |
| $SiO_2 + Al_2O_3$ | >84 |
| $Li_2O + Na_2O + K_2O$ | 7–8 |
| $CaO + BaO$ | ≦1. |

7. The borosilicate glass composition of claim 1, comprising in percent by weight on oxide basis:

| | |
|---|---|
| $SiO_2$ | 77.0–79.0 |
| $B_2O_3$ | 7.0–8.9 |
| $Al_2O_3$ | 3.5–5.5 |
| $Li_2O$ | 0.05–0.8 |
| $Na_2O$ | 6.0–8.0 |
| $K_2O$ | 0–3.0 |
| CaO | 0–1.0 |
| BaO | 0–1.0 |

-continued

| | |
|---|---|
| $ZrO_2$ | 1.0–2.0 |
| $SnO_2$ | 0–1.0 |
| SnO | 0–1.0 |
| $Fe_2O_3$ | 0–1.0 |
| $TiO_2$ | 0–2.0 |
| with | |
| $SiO_2 + B_2O_3$ | >85 |
| $SiO_2:B_2O_3$ | >9 |
| $SiO_2 + Al_2O_3 + ZrO_2$ | >83.5 |
| $Li_2O + Na_2O + K_2O$ | 7–8 |
| $CaO + BaO$ | ≦1. |

8. The borosilicate glass composition of claim 1, further comprising flux agents and/or refining agents selected from fluorides and/or chlorides in the batch compositions in portions up to 4(%-wt) $F^-$ and/or $Cl^-$.

9. The borosilicate glass composition of claim 1, wherein said composition includes earth alkali oxides up to 0.5 percent by weight on oxide basis.

* * * * *

UNITED STATES PATENT AND TRADEMARK OFFICE
CERTIFICATE OF CORRECTION

PATENT NO. : 5,599,753

DATED : February 4, 1997

INVENTOR(S) : Eckhart Watzke, Andrea Kämpfer, Thomas Kloss and Gerhard Kemmler It is certified that error appears in the above-identified patent and that said Letters Patent is hereby corrected as shown below:

On the title page, at [73] Assignee: please delete "Glaswerck", and substitute -- Glaswerk -- therefor.

On the title page, under "U.S. PATENT DOCUMENTS", item [56], before line 1: please insert -- 4,065,317 12/1977 Baak et al 501/70 --.

On the title page, under "U.S. PATENT DOCUMENTS", item [56], after line 8: please insert -- 5,017,521 5/1991 Yale et al 501/64 --.

On the title page, under "OTHER PUBLICATIONS", line 6, delete "Schnidt," and substitute -- Schmidt, -- therefor.

On the title page, under "OTHER PUBLICATIONS", line 16, delete "Glass" and substitute -- Glas -- therefor.

In column 1, line 36: delete "solutions The" and substitute -- solutions. The -- therefor.

In column 1, line 60: between "2" and "pages 634" please insert -- , --.

UNITED STATES PATENT AND TRADEMARK OFFICE
CERTIFICATE OF CORRECTION

PATENT NO. : 5,599,753

DATED : February 4, 1997

INVENTOR(S) : Eckhart Watzke, Andrea Kämpfer, Thomas Kloss and Gerhard Kemmler It is certified that error appears in the above-identified patent and that said Letters Patent is hereby corrected as shown below:

In column 3, line 67: delete "$5.3 \times 10^-$" and substitute -- $5.3 \times 10^{-6} K^{-1}$ -- therefor.

In column 4, line 1: delete "6K-1".

In column 5, line 20: delete "$5.3 \times 10^{-6} K^-$" and substitute -- $5.3 \times 10^{-6} K^{-1}$. -- therefor.

In column 5, line 21: delete "$_1$.".

In column 7, line 18: delete "$AL_2O_{3+}ZrO_2$" and substitute -- $AL_2O_3 + ZrO_2$ -- therefor.

In column 7, line 58: delete "145K" and substitute -- 145 K -- therefor.

In column 7, line 60: delete "110K" and substitute -- 110 K -- therefor.

In column 7, line 63: delete "140K" and substitute -- 140 K -- therefor.

UNITED STATES PATENT AND TRADEMARK OFFICE
CERTIFICATE OF CORRECTION

PATENT NO. : 5,599,753

DATED : February 4, 1997

INVENTOR(S) : Eckhart Watzke, Andrea Kämpfer, Thomas Kloss and Gerhard Kemmler It is certified that error appears in the above-identified patent and that said Letters Patent is hereby corrected as shown below:

In column 8, line 52: delete "190K" and substitute -- 190 K -- therefor.

In column 8, line 56: delete "135K" and substitute -- 135 K -- therefor.

In column 8, line 57: delete "150K" and substitute -- 150 K -- therefor.

In column 10, line 48: delete "TWB=$\sigma_B(1-\mu)/\alpha.E$" and substitute -- TWB=$\sigma_B(1-\mu)/\alpha \cdot E$ -- therefor.

In column 10, line 53: delete "modulu" and substitute -- modulus -- therefor.

Signed and Sealed this

Second Day of September, 1997

Attest:

Attesting Officer

BRUCE LEHMAN

Commissioner of Patents and Trademarks